United States Patent
Garcha

(10) Patent No.: US 10,369,887 B2
(45) Date of Patent: Aug. 6, 2019

(54) INVERTER SYSTEM CONTROLLER POWER OPTIMIZATION

(71) Applicant: FORD GLOBAL TECHNOLOGIES, LLC, Dearborn, MI (US)

(72) Inventor: Jaswant Singh Garcha, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 15/656,741

(22) Filed: Jul. 21, 2017

(65) Prior Publication Data

US 2019/0023130 A1 Jan. 24, 2019

(51) Int. Cl.
*B60L 1/02* (2006.01)
*B60W 20/00* (2016.01)
*B60W 50/00* (2006.01)
*H02M 7/537* (2006.01)

(52) U.S. Cl.
CPC .............. *B60L 1/02* (2013.01); *B60W 20/00* (2013.01); *B60W 50/0098* (2013.01); *H02M 7/537* (2013.01); *Y10S 903/904* (2013.01)

(58) Field of Classification Search
CPC ......... B60L 1/02; H02M 7/537; B60W 20/00; B60W 50/0098; Y10S 903/904
See application file for complete search history.

(56) References Cited

U.S. PATENT DOCUMENTS

| 5,501,267 | A | * | 3/1996 | Iritani | B60H 1/00007 165/11.1 |
| 5,706,667 | A | * | 1/1998 | Iritani | B60H 1/00828 165/244 |
| 5,899,081 | A | | 5/1999 | Evans et al. | |
| 6,070,650 | A | * | 6/2000 | Inoue | B60H 1/00428 165/202 |
| 6,347,528 | B1 | * | 2/2002 | Iritani | B60H 1/00357 62/323.1 |
| 6,581,678 | B1 | * | 6/2003 | Groemmer | B60H 1/00064 165/202 |
| 6,675,873 | B2 | | 1/2004 | Ieda et al. | |
| 7,086,246 | B2 | * | 8/2006 | Yoshii | H01M 8/04014 62/238.7 |
| 7,570,021 | B2 | * | 8/2009 | Togashi | B60K 6/445 320/130 |
| 7,845,187 | B2 | * | 12/2010 | Patel | B60H 1/00028 180/68.2 |
| 8,948,966 | B2 | * | 2/2015 | Kim | F25B 29/003 454/75 |
| 2005/0035657 | A1 | * | 2/2005 | Brummett | B60H 1/3226 307/10.1 |
| 2007/0075686 | A1 | * | 4/2007 | Togashi | B60K 6/445 320/130 |
| 2009/0154101 | A1 | * | 6/2009 | Korich | H02M 7/003 361/699 |

(Continued)

*Primary Examiner* — Tyler J Lee
(74) *Attorney, Agent, or Firm* — David Kelley; Brooks Kushman P.C.

(57) ABSTRACT

An inverter for a vehicle includes a power controller and gate drive board (GDB) electrically in series, the controller including logic circuitry configured to, responsive to presence of an ignition signal, permit flow of low voltage power through the controller to the GDB to activate the GDB, and responsive to presence of a wake-up signal, but not the ignition signal, prevent flow of low voltage power through the controller to the GDB.

18 Claims, 5 Drawing Sheets

(56) References Cited

U.S. PATENT DOCUMENTS

2009/0294195 A1* 12/2009 Otsuka .................. B60K 6/405
                                                180/65.275
2011/0011113 A1   1/2011 Jordan
2011/0215639 A1*  9/2011 Kurosaki ............. H04B 10/802
                                                307/9.1

* cited by examiner

INVERTER SYSTEM CONTROLLER POWER OPTIMIZATION

TECHNICAL FIELD

The present disclosure relates to systems and methods for optimizing power consumption of an inverter system controller (ISC).

BACKGROUND

A high voltage battery in an electrified vehicle may be recharged using either alternating current (AC) or DC charging. The vehicle may be connected to an AC power grid and receive electric energy via AC Level1 or AC Level 2 charging using a 120-volt (V) or 240-V connection, respectively. A connection to a DC charge-capable charging station may allow for recharging of the high voltage battery at various current rates, such as DC Level 1 200-450 V/80 amperes (A), DC Level 2 200-450 V/200 A, DC Level 3 200-450 V/400 A, and so on. In some cases, a DC charging session may transfer the same amount of energy quicker than an AC charging session.

SUMMARY

An inverter for a vehicle includes a power controller and a gate drive board (GDB) electrically in series, the controller including logic circuitry configured to, responsive to presence of an ignition signal, permit flow of low voltage power through the controller to the GDB to activate the GDB, and responsive to presence of a wake-up signal, but not the ignition signal, prevent flow of low voltage power through the controller to the GDB.

A method includes, responsive to presence of an ignition signal, by a power controller of an inverter, permitting flow of low voltage power through the controller to a gate drive board (GDB) and a resolver-to-digital converter to activate the GDB and the converter, each of the GDB and the converter being electrically in series with the controller, and responsive to presence of a wake-up signal, but not the ignition signal, preventing flow of low voltage power through the controller to the GDB and the converter.

A system for a vehicle includes an inverter including a gate drive board (GDB) and a power controller, the controller including logic circuitry configured to, responsive to detecting an ignition signal, permit flow of low voltage power to the GDB to activate the GDB, and responsive to receiving a wake-up signal, but not the ignition signal, prevent flow of power to the GDB and permit flow of low voltage power to energize a coil of a contactor to close the contactor.

DETAILED DESCRIPTION

Figure 1:
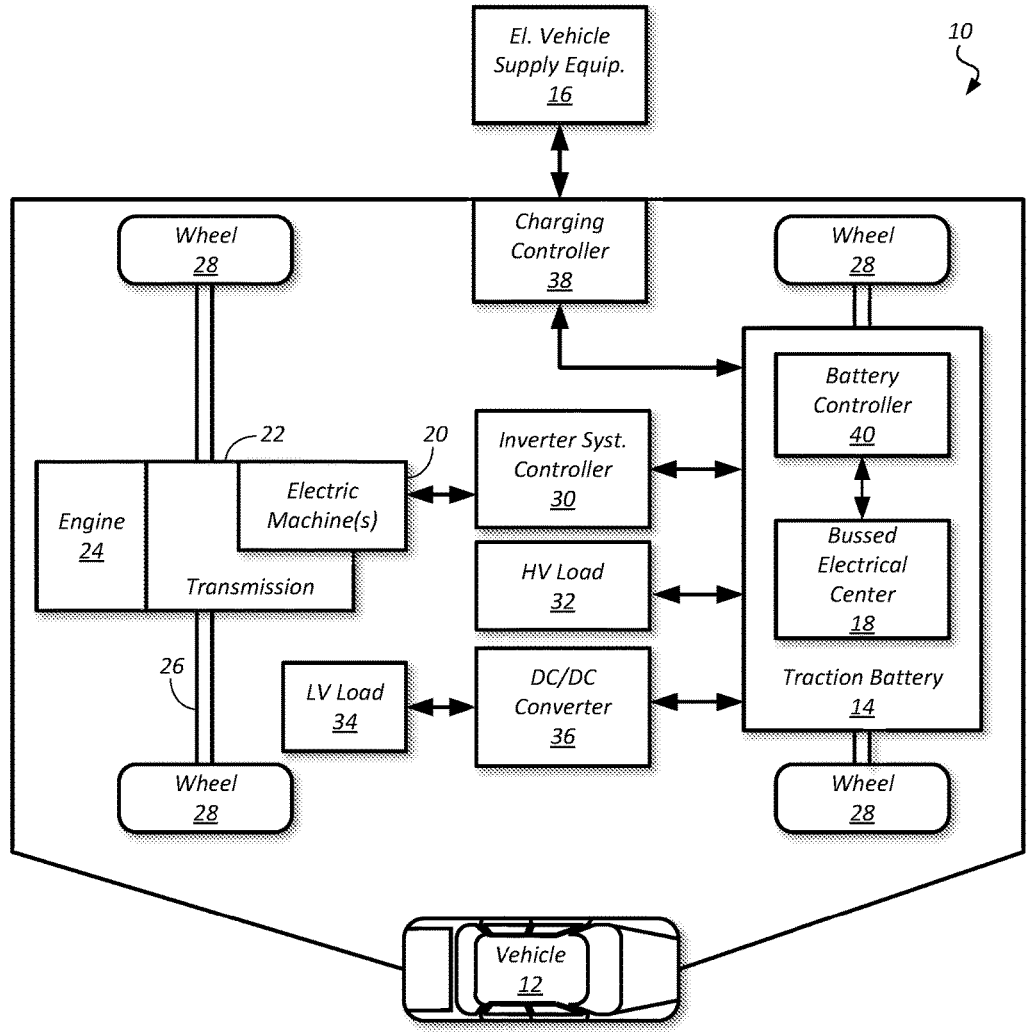
FIG. 1 is a block diagram of a plug-in hybrid electric vehicle (PHEV) illustrating a typical drivetrain and energy storage components.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Creating separate electrical power paths for each of the vehicle electrical components may not be practical and may result in time delays to a fully powered state, as well as, increased wiring complexity. Vehicle design may, therefore, necessitate several vehicle components to share an electrical power connector such that providing power to the connector may cause all the components sharing that connector to turn on at the same time. On the other hand, shared power connectors may impede an ability to selectively turn on just one connected component and not others also receiving power via the same connector. Powering the components when they are not in use may result in power consumption inefficiencies and premature deterioration of the components.

As one example, hybrid and electric vehicles may be equipped with one or more climate control components, such as, but not limited to, a positive temperature coefficient (PTC) heater, an electric air conditioning (A/C) unit, and so on. In some instances, the components may operate to adjust and maintain cabin temperature according to user settings and/or provide temperature control functionality for a traction battery, either automatically or upon receiving a predefined signal from another vehicle controller. Climate control adjustment may be necessary either when the vehicle ignition is ON, such as to increase cabin comfort when the vehicle is being operated, or when the vehicle ignition is OFF, such as to optimize the charging of the traction battery and/or to pre-condition the cabin according to user settings prior to ignition being turned ON.

An electrical connector providing power to enable the PTC heater and/or the electric A/C may also provide power to other high-voltage components, such that providing power to enable the heater or the A/C may cause the other high-voltage components to also receive power and, accordingly, turn on. As one example, the same high-voltage bus providing power to enable the PTC heater and electric A/C may also provide power to a power inverter subsystem configured to transfer and condition energy between motor/generator machines and the traction battery of a hybrid or electric vehicle. A logical switch may be configured to inhibit power flow to the inverter subsystem in response to detecting that the heater or A/C functionality is requested but powering the inverter subsystem is not necessary, e.g., the vehicle ignition is in the OFF state. The logical switch may be further configured to enable power flow to the inverter subsystem in response to detecting an ignition ON signal. The logical switch may also be configured to, responsive to receiving an ignition ON signal at a time when the heater or A/C are already being used to pre-condition the cabin or heat or cool the traction battery during charging, enable power flow, via the connector, to turn on the inverter subsystem.

FIG. 1 depicts a typical plug-in hybrid-electric vehicle (PHEV) system 10. A plug-in hybrid-electric vehicle 12, hereinafter vehicle 12, may comprise at least one traction battery 14 configured to receive electric charge via a charging session at a charging station (not shown) connected to a power grid (not shown). The vehicle 12 may, for example, cooperate with electric vehicle supply equipment (EVSE) 16 of the charging station to coordinate the charge transfer from the power grid to the traction battery 14. The power grid may include a device that harnesses renewable energy, such as a photovoltaic (PV) solar panel, or a wind turbine (not shown).

The EVSE 16 may include circuitry and controls to regulate and manage the transfer of energy between the power grid and the vehicle 12. As one example, the EVSE 16 may include a charge connector (not shown) having a plurality of pins configured to mate with corresponding recesses of a charge port (not shown) of the vehicle 12. In some instances, the charge port may be incorporated as part of a charging controller 38 and may define any type of port configured to transfer power from the EVSE 16 to the vehicle 12. The charging controller 38 of the vehicle 12 in communication with the EVSE 16, e.g., via the charge port, may control the charge flow between the EVSE 16 and the traction battery 14. Similarly, the EVSE 16 may include a control module (not shown) that conditions the power supplied from the EVSE 16 to provide the voltage and current levels to the vehicle 12, as requested, for example, by the battery charger controller 38.

The EVSE 16 may be designed to provide single- or three-phase alternating current (AC) or direct current (DC) charge to the vehicle 12. Differences in the charge connector and charging protocol may exist between an AC-, a DC-, and an AC/DC-capable EVSE. The EVSE 16 may be further configured to provide different levels of AC and DC charging including, but not limited to, Level 1 120-volt (V) AC charging, Level 2 240-V AC charging, Level 1 200-450-V and 80-ampere (A) DC charging, Level 2 200-450-V and up to 200-A DC charging, Level 3 200-450-V and up to 400-A DC charging, and so on. Given voltage and current specifications of a particular charging system, time required to receive a given amount of electric charge may vary from several hours to several minutes.

In one example, both the EVSE 16 and the vehicle 12 charging port may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on. In one example, the recesses of the charge port of the charging controller 38 may comprise a plurality of terminals, such as terminals designated for Level 1 and 2 AC power exchange, terminals designated for a ground connection, terminals designated for control signals transferred between the EVSE 16 and the vehicle 12, and terminals designated for DC charging, such as, but not limited to, Levels 1, 2, or 3 DC charging.

By way of an example, at least one terminal may be used to conduct control pilot signals and/or to conduct proximity detection signals. A proximity signal may be a signal indicating a state of engagement between the charge port of the charging controller 38 and the connector of the EVSE 16. A control pilot signal, e.g., a low-voltage pulse-width modulation (PWM) signal, may be used to control the charging process. As described in reference to at least FIG. 2A, energy flow to and from the traction battery 14 may be performed via a bussed electrical center (BEC) 18 and may be managed by a battery controller 40.

The vehicle 12 may further comprise one or more electric machines 20 mechanically connected to a hybrid transmission 22. The electric machines 20 may be configured to operate as a motor or a generator. In addition, the hybrid transmission 22 is mechanically connected to an engine 24. The hybrid transmission 22 is also mechanically connected to a drive shaft 26 that is mechanically connected to the wheels 28. The electric machines 20 can provide propulsion and deceleration capability when the engine 24 is turned on or off using energy stored in the traction battery 14. The electric machines 20 also act as generators and can provide fuel economy benefits by recovering energy that would normally be lost as heat in the friction braking system. The electric machines 20 may also provide reduced pollutant emissions since the vehicle 12 may be operated in electric mode under certain conditions. The traction battery 14 typically provides a high-voltage direct current (DC) output.

The traction battery 14 may be electrically connected to an inverter system controller (ISC) 30. The ISC 30 is electrically connected to the electric machines 20 and provides the ability to bi-directionally transfer energy between the traction battery 14 and the electric machines 20. In a motor mode, the ISC 30 may convert the DC output provided by the traction battery 14 to a three-phase alternating current (AC) as may be required for proper functionality of the electric machines 20. In a regenerative mode, the ISC 30 may convert the three-phase AC output from the electric machines 20 acting as generators to the DC input required by the traction battery 14. While FIG. 1 depicts a typical plug-in hybrid electric vehicle, the description herein is equally applicable to a pure electric vehicle. For a pure electric vehicle, e.g., battery electric vehicle (BEV), the hybrid transmission 22 may be a gear box connected to the electric machine 20 and the engine 24 may not be present.

In addition to providing energy for propulsion, the traction battery 14 may provide energy for other vehicle electrical systems. For example, the traction battery 14 may transfer energy to high-voltage loads 32, such as, but not limited to, an air conditioning (A/C) compressor and electric heater. In another example, the traction battery 14 may provide energy to low-voltage loads 34, such as, but not limited to, an auxiliary 12-V battery. In such an example, the vehicle 12 may include a DC/DC converter 36 configured to convert the high-voltage DC output of the traction battery 14 to a low-voltage DC supply that is compatible with the low-voltage loads 34. The various components discussed may have one or more associated controllers to control and monitor the operation of the components. The controllers may communicate via a serial bus (e.g., Controller Area Network (CAN)) or via discrete conductors.

Figure 2B:
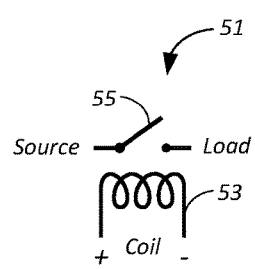
FIG. 2B is a schematic diagram illustrating a contactor.
Figure 2A:
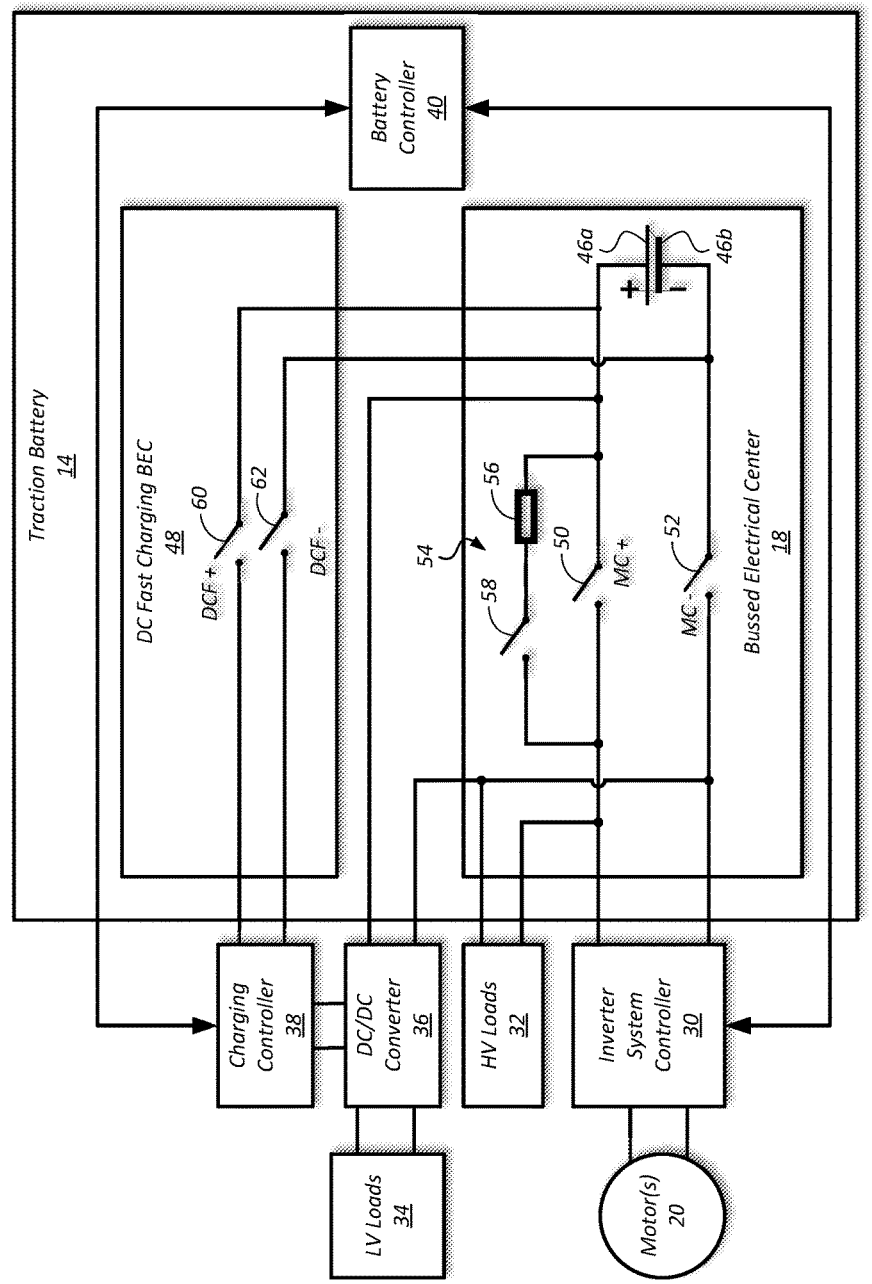
FIG. 2A is a block diagram illustrating an example energy transfer system arrangement.

FIG. 2A illustrates an example contactor arrangement 44 for transferring energy to and from the traction battery 14 of the vehicle 12. A plurality of electrochemical cells (not shown) of the traction battery 14 may be connected to the BEC 18 via positive and negative terminals 46. The battery cells may have any suitable configuration and serve to receive and store electric energy for use in operation of the vehicle 12. As one example, each cell may provide a same or different nominal level of voltage. As another example, the battery cells may be arranged into one or more arrays, sections, or modules further connected in series or in parallel. While the traction battery 14 is described to include, for example, electrochemical battery cells, other types of energy storage device implementations, such as capacitors, are also contemplated.

The negative and positive terminals 46 may comprise electrically conductive material, such as metal, and may have any suitable configuration. In some examples, the BEC 18 may include a plurality of connectors and switches allowing selective supply and withdrawal of electric energy to and from the battery cells via the positive and negative terminals 46.

The battery controller 40 may be connected to a plurality of sensors (not shown) disposed within the traction battery 14 and may be configured to control energy flow to and from the traction battery 14 based on sensor measurements. For example, the battery controller 40 may be configured to monitor and manage temperature, state-of-charge (SOC), and other operating parameters of each battery cell or combinations of cells under various vehicle 12 operating conditions. The battery controller 40 may be in communication with the ISC 30 and may be configured to, in response to detecting that an operating parameter is greater than or less than a predetermined threshold, send, to the ISC 30, a signal requesting the ISC 30 to provide power to enable one or more high-voltage loads 32, such as the heater or the electric A/C.

Upon receiving a request, the ISC 30 may be configured to provide power to the BEC 18 to open or close one or more of the plurality of switches. The battery controller 40 may be connected to other vehicle controllers (not shown), such as, but not limited to, an engine controller and transmission controller, and may command the ISC 30 to provide power to open or close a plurality of switches in response to a predetermined signal from the other vehicle controllers.

The battery controller 40 may also be in communication with the charging controller 38. For example, the charging controller 38 may send a signal to the battery controller 40 indicative of a charging session request. The battery controller 40 may then command the charging controller 38 to provide power to open or close a plurality of switches allowing the transfer of electric energy between the EVSE 16 and the traction battery 14 via a charging session, e.g., a DC fast charging session.

The BEC 18 may comprise a positive main contactor 50 electrically connected to the positive terminal 46a of the traction battery 14 and a negative main contactor 52 electrically connected to the negative terminal 46b of the traction battery 14. In one example, closing the positive and negative main contactors 50, 52 allows the flow of electric energy to and from the battery cells. In such an example, the battery controller 40 may command the ISC 30 to provide power to open or close the main contactors 50, 52, in response to detecting that traction battery 14 temperature is greater than or less than a predetermined threshold. In another example, the battery controller 40 may command the BEC 18 to open or close the main contactors 50, 52 in response to receiving a signal from the charging controller 38 indicative of a request to initiate or terminate transfer of electric energy to and from the traction battery 14.

The BEC 18 may further comprise a pre-charge circuit 54 configured to control an energizing process of the positive terminal 46a. In one example, the pre-charge circuit 54 may include a pre-charge resistor 56 connected in series with a pre-charge contactor 58. The pre-charge circuit 54 may be electrically connected in parallel with the positive main contactor 50. When the pre-charge contactor 58 is closed the positive main contactor 50 may be open and the negative main contactor 52 may be closed allowing the electric energy to flow through the pre-charge circuit 54 and control an energizing process of the positive terminal 46a.

In one example, the battery controller 40 may command BEC 18 to close the positive main contactor 50 and open the pre-charge contactor 58 in response to detecting that voltage level across the positive and negative terminals 46a, 46b reached a predetermined threshold. The transfer of electric energy to and from the traction battery 14 may then continue via the positive and negative main contactors 50, 52. For example, the BEC 18 may support electric energy transfer between the traction battery 14 and the ISC 30 during either a motor or a generator mode via a direct connection to conductors of the positive and negative main contactors 50, 52.

As shown, for example, in FIG. 2B, each of the contactors 50, 52 and the pre-charge contactor 54 may define an electromechanical device 51 comprising an inductive coil 53 and a relay 55. In one example, the ISC 30 may be configured to, in response to a corresponding request from the battery controller 40, energize the inductive coil 53 using a predefined amount of current, e.g., pull-in current $I_{pull\_in}$, to cause the relay 55 to close. In another example, the ISC 30 may be further configured to, in response to a corresponding request from the battery controller 40, de-energize the inductive coil 53, e.g., providing amount of current less than drop-out current $I_{drop\_out}$, to cause the relay 55 to open. In still another example, following the closing of the relay 55, the ISC 30 may be configured to provide a predefined amount of current, e.g., hold current $I_{hold}$, through the inductive coil 53 to keep the relay 55 in a closed position, where magnitude of hold current $I_{hold}$ may be both less than magnitude of pull-in current $I_{pull\_in}$ and greater than magnitude of drop-out current $I_{drop}$_out.

Continuing with reference to FIG. 2A, closing one or more of the contactors 50, 52, and 54, in some instances, enables power flow to turn on the high-voltage loads 32, such as compressors and electric heaters, via a connection to the conductors that extend between a respective one of the contactor 50, 52, 54 and the ISC 30. In still another example, closing one or more of the contactors 50, 52, and 54 may enable energy transfer to and from the low-voltage loads 34, such as a 12-V auxiliary battery, via the DC/DC converter 36 connected to electrical conductor lines extending between the ISC 30 and the positive and negative terminals 46a, 46b.

A DC fast charging BEC (hereinafter, charging BEC) 48 may comprise a DC fast charging positive contactor (hereinafter, charging positive contactor) 60 electrically connected to the positive terminal 46a and a DC fast charging negative contactor (hereinafter, charging negative contactor) 62 electrically connected to the negative terminal 46b of the traction battery 14. The charging controller 38 may provide power to close the charging negative contactor 62 and to close the charging positive contactor 60 in response to a signal indicative of a request for a DC fast charging session. For example, the battery controller 40 may command the charging controller 38 to close the negative charging contactor 62 and to close the positive charging contactor 60 in response to receiving a signal from the charging controller 38 indicative of a request to charge the traction battery 14. The battery controller 40 may selectively command the charging controller 38 to open the positive charging contactor 60 and to open the negative charging contactor 62 in response to receiving a notification that a DC fast charging session is complete.

For simplicity and clarity AC charging connections between the charging controller 38 and the traction battery 14 have been omitted. In one example, the main contactors 50, 52 in combination with the pre-charge circuit 54 may be used to transfer AC energy between the EVSE 16 and the traction battery 14. In another example, the battery controller 40 may be configured to command the opening and closing of one or more AC charging contactors (not shown) in response to receiving a signal from the charging controller 38 indicative of a request to initiate AC charging.

Figure 3:
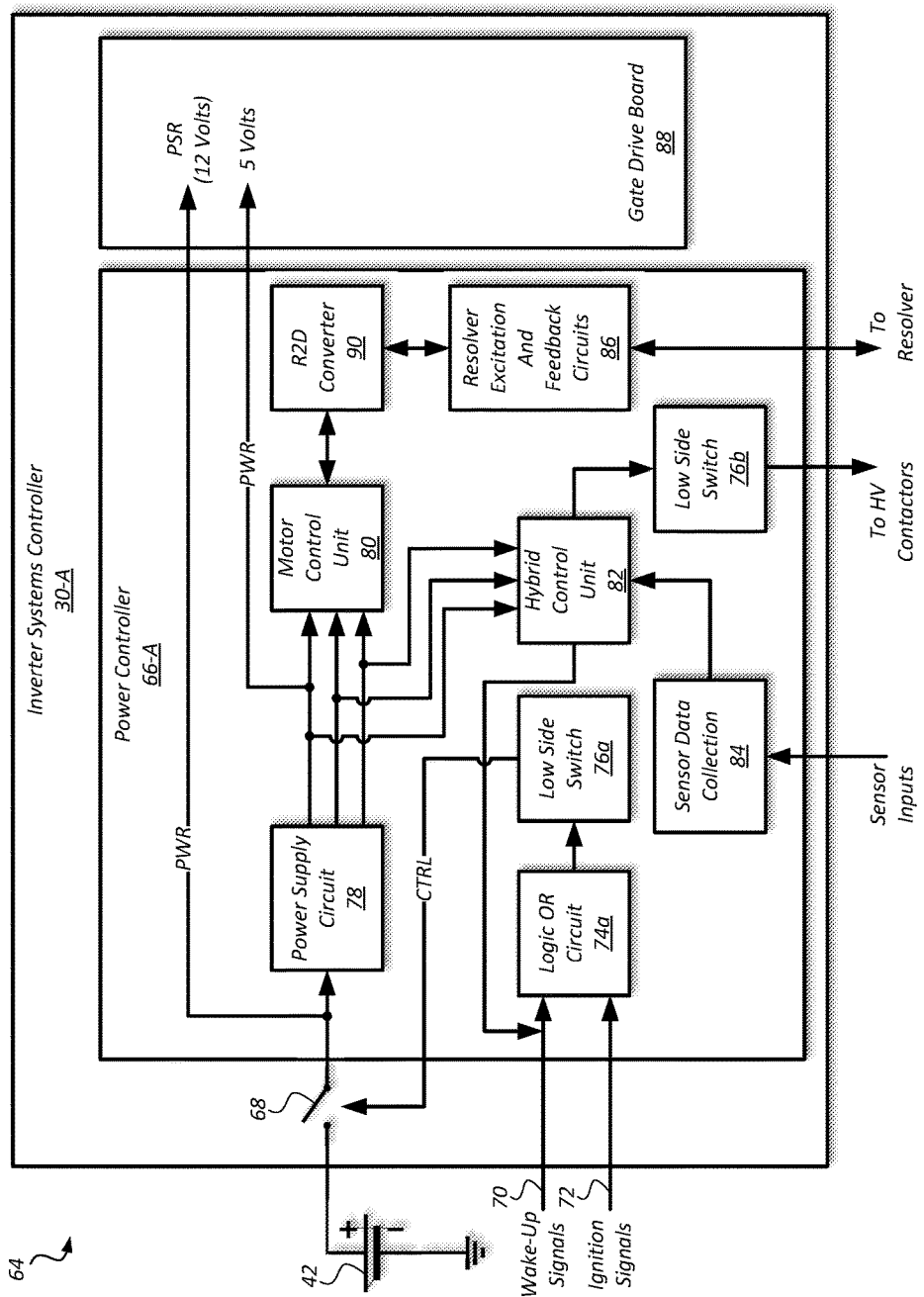
FIG. 3 is a block diagram illustrating an example power circuit arrangement for an inverter system controller.

FIG. 3 illustrates an example power circuit arrangement 64 for the ISC 30-A configured to provide low-voltage power to turn on the high-voltage loads 32 when the traction battery 14 is being charged. A power controller 66-A of the ISC 30-A may be configured to selectively close a low-voltage switch 68 to provide low-voltage power to close at least one of the positive and negative main contactors 50, 52 and to power other components, such as, but not limited to, a gate drive board (GDB) 88 of the ISC 30-A, resolver circuits, and so on. In some instances, the low-voltage switch 68 may be connected to a low-voltage battery 42, e.g., 12-V auxiliary battery of the vehicle 12.

As one example, the power controller 66-A may include a power supply circuit 78 configured to provide at least a portion of energy to power a pair of microcontrollers 80, 82 (hereinafter, a motor control unit and a hybrid control unit 80, 82, respectively). The motor control unit 80 may be configured to control (provide excitation signals to) one or more resolvers (not shown) of the vehicle 12, each defining, for example, an electromechanical sensor configured to measure precise angular position by operating as variable coupling transformers, with an amount of magnetic coupling between the primary winding and a plurality of secondary windings varying according to the position of the rotating element (e.g., a rotor of the electric machine 20 typically mounted on a shaft of the machine 20). The resolvers may, thus, be configured to determine a precise shaft rotation.

The resolver of the vehicle 12 may comprise a primary winding on the rotor of the electric machine 20 and two secondary windings on a stator of the machine 20. As another example, a resolver may define a variable reluctance resolver type and may include no windings on the rotor. Instead, the primary and secondary windings of the variable reluctance resolver may all be positioned on the stator, such that the saliency (exposed poles) of the rotor couples the sinusoidal variation in the secondary winding with the angular position.

The resolvers may, accordingly, define transducers or other analog or digital electrical or electromechanical components configured to convert an angular position and/or velocity of a rotating shaft to an electrical signal. The resolvers may also be configured to output signals proportional to the sine and/or cosine of the shaft angle. A resolver-to-digital (R2D) converter 90 may be configured to convert output signals of the resolvers to a digital output corresponding to the shaft angle and/or velocity and may provide the generated digital output to the motor control unit 80. In some examples, the power controller 66-A may include one or more resolver excitation and feedback circuits 86 configured to filter and/or amplify excitation signals sent to the resolvers by the corresponding microprocessor, as well as, adjust gain for and/or filter measurement signals output by the resolvers before providing the signals to the motor control unit 80.

The hybrid control unit 82 of the power controller 66-A may be configured to receive, e.g., at a sensor data collection unit 84, signals from one or more sensors of the vehicle 12. The sensor data collection unit 84 of the power controller 66-A may, for example, be configured to receive signals from one or more temperature sensors (not shown) of the traction battery 14. The hybrid control unit 82 may be configured to, in response to detecting during charging of the traction battery 14 that cooling or warming of the battery cells may be necessary, request low-voltage power flow and may use the power to energize the respective inductive coil of the contactor(s) 50, 52, and 58 to close the relay of the contactor(s) thereby enabling power flow to the heater and/or electric A/C. In some examples, the hybrid control unit 82 may be configured to request low-voltage power flow by "waking up," or causing to become active, other components of the power controller 66-A.

To provide the low-voltage power, such as the power requested by the hybrid control unit 82, the power controller 66-A may be configured to cause the switch 68 to close, thereby, powering up the GDB 88, one or more resolver circuits, and other connected components even though they are not directly supplying, or otherwise assisting, climate control of the traction battery 14 during charging. The other connected components, such as the GDB 88 and the resolver circuits, may continue to receive power and remain in a turned on (active) state while the heater and/or the electric A/C operate to adjust temperature of the battery cells.

The GDB 88 may be powered using two independent supply rails, such as a primary side regulator (PSR) supply rail and a 5-V power supply rail, and may be configured to power (drive) one or more components defining the ISC 30-A. The GDB 88 may define one or more digital logic circuits and microcontrollers configured to generate a switching signal, e.g., an output signal of several milliamperes of current, to turn a transistor on and off. A transistor which is directly driven by a weak signal may switch very slowly resulting in an increased power loss. Accordingly, the GDB 88 may be connected between an output of the microcontroller and an input of the power transistor and may be configured to prevent the gate capacitor of the transistor from drawing current too quickly during switching as it may cause a current overdraw in the logic circuit or the microcontroller, resulting in overheating and either significant damage or a complete destruction of the chip.

As one example, the GDB 88 may be configured to power a variable voltage converter (VVC) (not shown) that provides bi-directional voltage boost and reduction for energy transferred between the electric machines 20 and the battery cells of the traction battery 14. The GDB 88 may be further configured to power an inverter (not shown) that inverts DC energy to AC and rectifies AC to DC transferred between the electric machines 20 and the traction battery 14.

The power controller 66-A may be configured to power on in response to receiving one of a wake-up signal 70 and an ignition signal 72. The wake-up signal 70 may be a digital waveform having a predefined format or pattern generated by a local signal source (e.g., one or more controllers of the vehicle 12) or by a remote source (e.g., handheld transmitter in communication with the vehicle 12 controller) in response to one or more predefined conditions. As one example, the wake-up signal 70 may comprise a request for a change in operating mode of the ISC 30, e.g., from a sleep mode, or a reduced power consumption mode, to a fully powered mode, and may, for example, be provided via a bus wake-up, a terminal wake-up, and so on. In some instances, as described, for example, in reference to the hybrid control unit 82, the wake-up signal 70 may originate from one or more microcontrollers internal to the power controller 66-A in response to receiving one or more sensor signals and determining that a supply of power is necessary to one or more components supplied by the power controller 66-A.

The ignition signal 72 may be a digital waveform having a predefined format or pattern different from the format or pattern of the wake-up signal 70 and may be generated in response to one or more predefined conditions. In some examples, the ignition signal 72 may be indicative of one or more states (or a change from a given state to another state) of the vehicle 12 ignition switch and may be sent to the power controller 66-A by a body controller.

In response to either of the signals 70, 72, the power controller 66-A may be configured to cause the low-voltage switch 68 to close to provide power to all components connected thereto, such as, power to close at least one of the positive and negative main contactors 50, 52, power to turn on the GDB 88, the VVC, the inverter, and so on, and power to turn on the R2D converter 90, the resolver excitation and feedback circuits 86 signal converters, signal filters, and other connected components.

The power controller 66-A may include a first logic circuit 74a and a pair of low-side switches 76 configured to close the switch 68 to provide a 12-V power supply line to the GDB 88 and to power the power supply circuit 78. The first logic circuit 74a may be a digital logic gate configured to send a signal to a first low-side switch 76a in response to receiving at least one of the signals 70, 72. The first logic circuit 74a may define an inclusive or an exclusive OR gate configured to generate a HIGH output in response to at least one inputs being HIGH and in response to only one of the inputs being HIGH, respectively. In one example, the first logic circuit 74a may define an integrated circuit (IC) including one or more diodes, transistors, relays, or other electronic or mechanical components arranged to generate output based on a logical inclusive or exclusive disjunction truth function. The first logic circuit 74a may define the IC constructed using one or more fabrication technologies, such as, but not limited to, complimentary metal-oxide-semiconductor (CMOS), complimentary-symmetry metal-oxide-semiconductor (COS-MOS), N-type metal-oxide-semiconductor (NMOS), P-type metal-oxide-semiconductor (PMOS), bipolar complimentary metal-oxide-semiconductor (BiMOS), and transistor-transistor logic (TTL).

In response to receiving a HIGH output signal from the first logic circuit 74a, the first low-side switch 76a operates to cause the switch 68 to close. When closed, the switch 68 may be configured to power both the GDB 88, e.g., via a 12-V power supply rail, and the power supply circuit 78 using low-voltage, e.g., 12 V, power. The power supply circuit 78 may be configured to power the motor and hybrid control units 80, 82 and may be further configured to power the GDB 88 via a low-voltage 5 V power line.

In response to receiving a corresponding signal from the power supply circuit 78, the hybrid control unit 82 may be configured to send control signals to activate the second low-side switch 76b that, in turn, enables power flow to the one or more contactors 50, 52, and 58 of the traction battery 14. The power supply circuit 78, in response to the closing of the switch 68, may be further configured to power the motor control unit 80 configured to generate excitation signals for the resolvers by supplying power to the R2D converter 90 and the resolver excitation and feedback circuits 86.

Thus, in response to either of the signals 70 and 72, whether originating from one of the other controllers of the vehicle 12 or from the hybrid control unit 82 in response to detecting that a temperature of the traction battery 14 exceeds a first predefined threshold or is less than a second predefined threshold, the power controller 66-A may provide power to enable the hybrid control unit 82 to close at least one of the positive and negative main contactors 50, 52, as well as, provide power to turn on the GDB 88 and other connected components receiving power therefrom, e.g., the motor control unit 80, at a same time. The closing of the low-voltage switch 68 by the power controller 66-A may, accordingly, cause the GDB 88 to power up and remain active (turned on) while the hybrid control unit 82 is in a fully powered state to enable power flow to the high-voltage loads 32.

Figure 4:
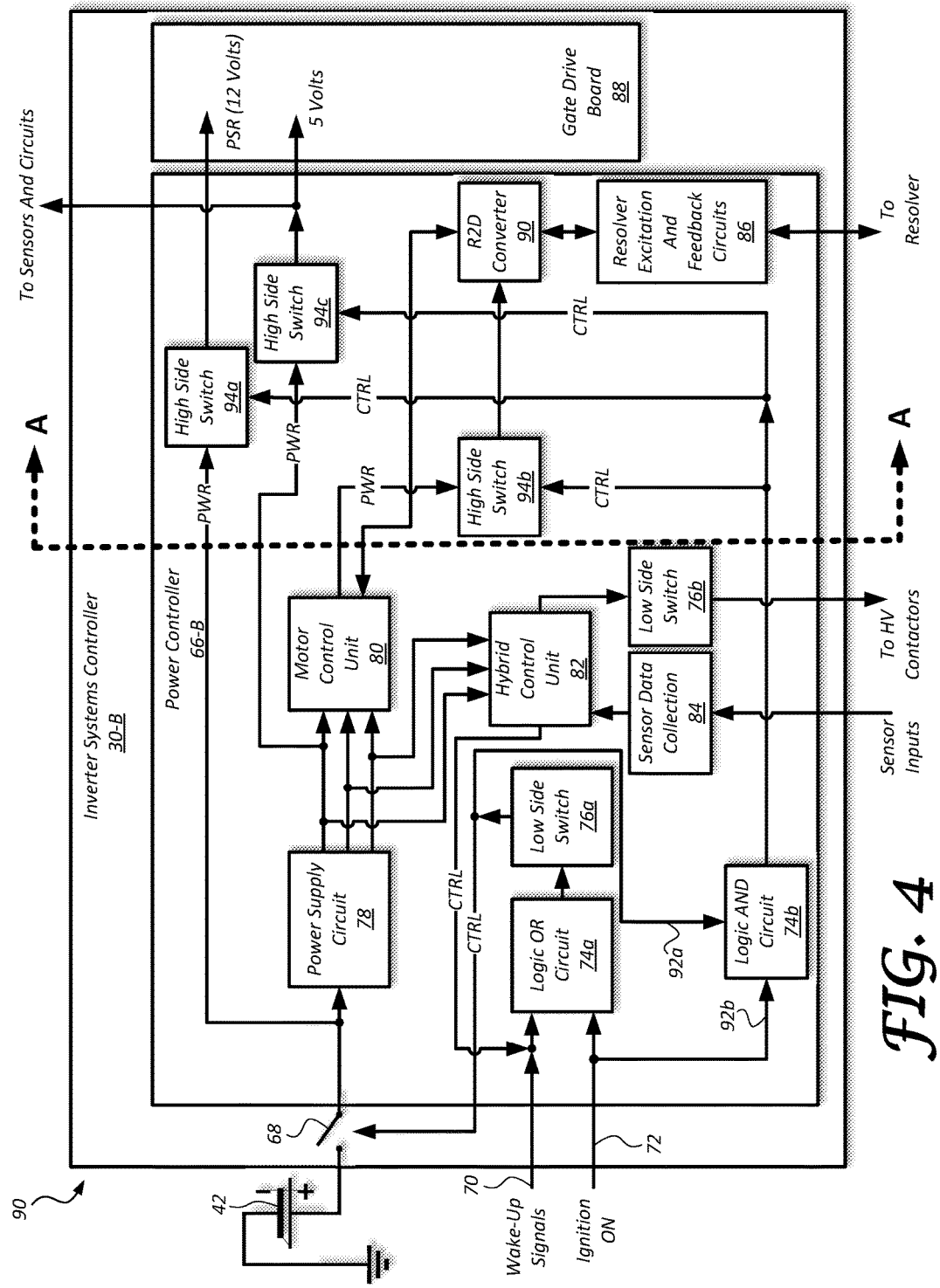
FIG. 4 is a block diagram illustrating the inverter systems controller including logic circuitry.

FIG. 4 illustrates an example power circuit arrangement 90 for the ISC 30-B configured to provide power to turn on the high-voltage loads 32, but not the GDB 88, the R2D converter 90, or the resolver excitation and feedback circuits 86, when the traction battery 14 is being charged and the vehicle 12 ignition switch is OFF. A power controller 66-B may include a second logic circuit 74b defining two inputs 92, of which a first input 92a is connected to the output of the first low-side switch 76a and a second input 92b is connected to the ignition signal 72 input line of the first logic circuit 74a. The second logic circuit 74b may be configured to, in response to receiving signals at both inputs 92 at a same time, send a control signal to a plurality of high-side switches 94 to activate the high-side switches 94.

The second logic circuit 74b may be a digital logic gate configured to send a control signal to the high-side switches 94 in response to detecting presence of both the ignition signal 72 and the HIGH output signals generated by the first low side switch 76a. The second logic circuit 74b may define an AND gate configured to generate a HIGH output in response to both inputs 92 to the second logic circuit 74b being HIGH at a same time. In one example, the second logic circuit 74b may define an integrated circuit (IC) including one or more diodes, transistors, relays, or other electronic or mechanical components arranged to generate output based on a logical conjunction truth function. The second logic circuit 74b may define the IC constructed using one or more fabrication technologies, such as, but not limited to, complimentary metal-oxide-semiconductor (CMOS), complimentary-symmetry metal-oxide-semiconductor (COS-MOS), n-type metal-oxide-semiconductor (NMOS), p-type metal-oxide-semiconductor (PMOS), bipolar complimentary metal-oxide-semiconductor (BiMOS), and transistor-transistor logic (TTL).

In one example, a first high-side switch 94a may be connected between output of the second logic circuit 74b and input of the GDB 88 and may be configured to transfer low-voltage power to the GDB 88 in response to receiving both a power signal, e.g., via the switch 68 in a closed state, and a control signal output by the second logic circuit 74b. In another example, a second high-side switch 94b may be connected between output of the second logic circuit 74b and input of the R2D converter 90. The second high-side switch 94b may be powered by the motor control unit 80, e.g., when the switch 68 is in a closed state, and may be configured to provide power to the R2D converter 90 in response to receiving both a power signal from the control unit 80 and a control signal output by the second logic circuit 74b. In still another example, a third high-side switch 94c may be connected between the output of the second logic circuit 74b and input to the GDB 88 and may be configured to power to the GDB 88, e.g., via a 5-V power rail, in response to receiving both a power signal, e.g., via the power supply circuit 78 when the switch 68 is in a closed state, and a control signal output by the second logic circuit 74b.

Accordingly, the ISC 30-B may be configured to selectively power more or fewer components based on a state of the ignition switch as received at the input to the ISC 30-B. In response to receiving the wake-up signal 70 while the ignition signal 72 line is inactive, the ISC 30-B may selectively power the hybrid control unit 82 to close the one or more of the contactors 50, 52, and 58 and to enable power flow to one or more high-voltage loads 32 and may selectively inhibit power flow to the GDB 88 and the R2D converter 90 powering the resolver excitation and feedback circuits 86 to activate the resolvers. As illustrated in FIG. 4, the ISC 30-B may inhibit power flow to one or more circuits to a right side of a dividing line A-A and may power one or more circuits to a left side of the dividing line A. The ISC 30-B may, thereby, be configured to consume less power than the ISC 30-A to enable power flow to close at least one of the contactors 50, 52, and 58 to turn on one or more of the high-voltage loads 32, such as the heater and/or electric A/C, in response to detecting that the traction battery 14 or the cabin of the vehicle 12 need conditioning when the traction battery 14 is being charged and the ignition is OFF. In some instances, the ISC 30-B may be configured to consume 50% less power than the ISC 30-A to power one or more high-voltage loads 32 when the ignition is OFF. As another example, the ISC 30-B may be configured to consume 65% less power than the ISC 30-A to power the high-voltage loads 32 during ignition OFF state.

Figure 5:
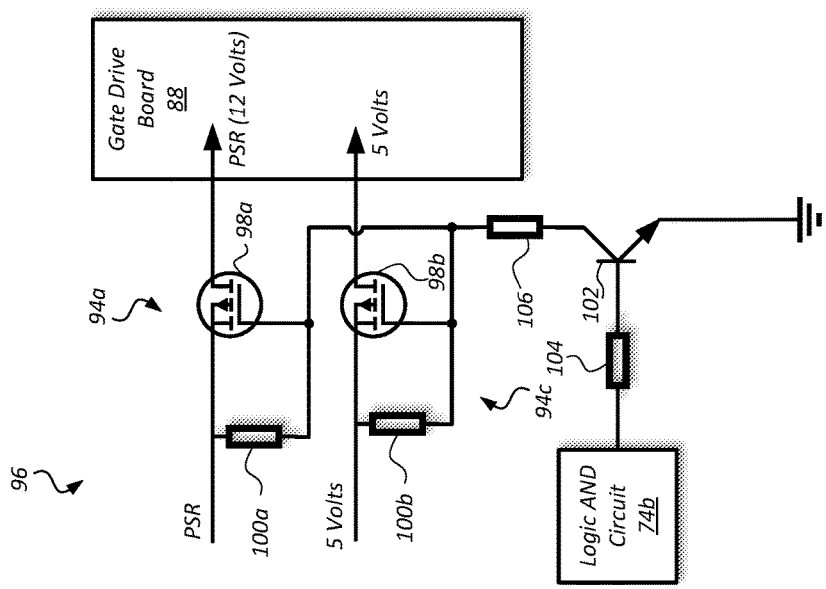
FIG. 5 is a schematic diagram illustrating an example high-side switch arrangement.

FIG. 5 illustrates an example schematic diagram 96 including example high-side switches 94a and 94c configured to inhibit power flow to the GDB 88 when the second logic circuit 74b is outputting a LOW output signal. The high-side switches 94a and 94c may be further configured to permit power flow to the GDB 88 in response to detecting that the second logic circuit 74b is outputting a HIGH output signal. While the example diagram 96 illustrates the switches 94a and 94c, the operating modes described herein may be equally applicable to the switch 94b as described in reference to at least FIG. 4.

Each of the high-side switches 94a and 94c may define a load switch and may be controlled by an external enable signal, such as, for example, output signal of the second logic circuit 74b. Each of the high-side switches 94a and 94c may include a pass element 98, such as a transistor, e.g., an enhancement-mode metal-oxide semiconductor field effect transistor (MOSFET), that, when active, operates to direct electric current from a power source to the GDB 88 and, when inactive, inhibits electric current flow from the power source to the GDB 88. In one example, the pass element 98a of the high-side switch 94a is powered by the low-voltage battery 42, e.g., via a 12-V connection with the switch 68, and the pass element 98b of the high-side switch 94c is powered using a connection with an output of the power supply circuit 78.

As an example, if each of the pass elements 98 defines a p-channel MOSFET, the pass elements 98 may be configured to enable power flow to the GDB 88 in response to a difference between voltage at a source terminal and voltage at a gate terminal exceeding a threshold voltage. Resistors 100a, 100b may each be connected between gate and source terminals of the pass elements 98 and may be configured to decrease a turn-off time of the pass elements 98 by draining a predefined parasitic capacitance between the gate and source terminals after the source voltage is removed.

The second logic circuit 74b may be configured to turn the pass elements 98a and 98b on and off using a bipolar junction transistor 102. The transistor 102 may be configured to turn on, in response to detecting that output of the second logic circuit 74b is HIGH, and may be configured to turn off, in response to detecting that output of the second logic circuit 74b is LOW. Turning on the transistor 102 may cause the gate terminal of the respective pass element 98 to be pulled to ground, thereby, turning on the pass element 98. Biasing resistors 104, 106 may be configured to create a first and second predefined voltage differences, respectively, between the gate terminal and the threshold voltage of the respective pass element 98.

Figure 6:
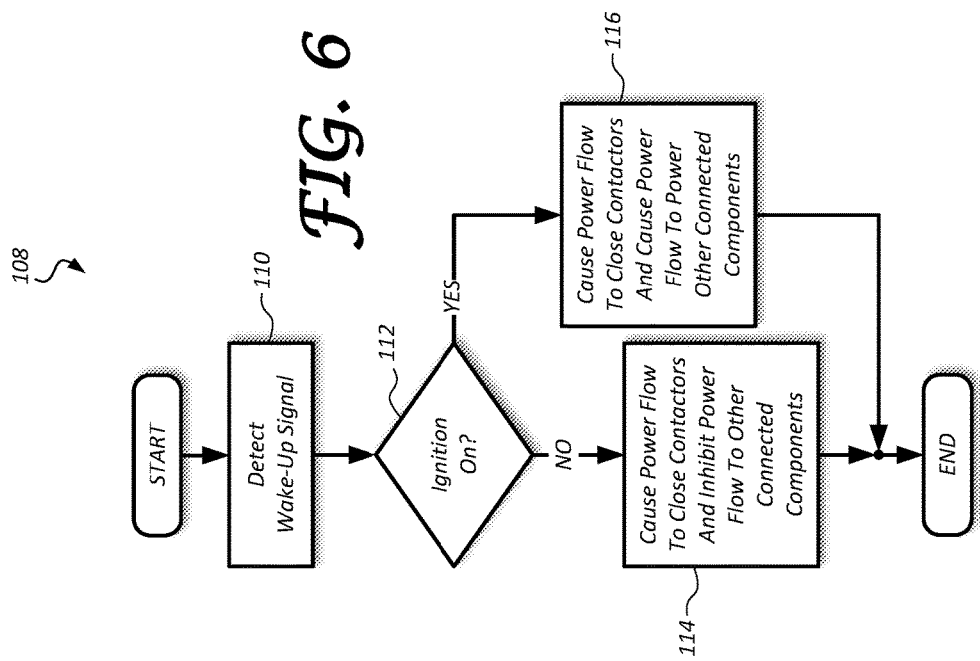
FIG. 6 is a flowchart illustrating an algorithm for controlling power flow to at least one component of the inverter systems controller.

FIG. 6 illustrates an example power optimization method 108 for inhibiting power flow to connected components in response to detecting a request to power the heater or the electric A/C and confirming that ignition of the vehicle 12 is off. In one example, operations of the example method 108 may be performed by the power controller 66-B, as described in reference to at least FIGS. 4-5.

The power controller 66-B may detect, at operation 110, a wake-up signal indicative of a request to power the closing of the one or more contactors 50, 52, 58 and one or more connected components receiving power via the power controller 66-B. At operation 112, the power controller 66-B determines whether ignition of the vehicle 12 is on.

In response to detecting at operation 112 that the ignition is off, the power controller 66-B, at operation 114, may cause power flow to close the contactors 50, 52, 58 and inhibit power flow to power the connected components receiving power via the power controller 66-B. In response to detecting at operation 112 that the ignition is on, the power controller 66-B may, at operation 116, cause power flow to close the contactors 50, 52, 58 and may cause power flow to power the connected components receiving power via the power controller 66-B. The example power optimization method 108 may then end. In some examples, the example method 108 may repeat in response to the power controller 66-B detecting a wake-up signal indicative of a request to power the closing of the one or more contactors 50, 52, 58 and one or more connected components receiving power via the power controller 66-B.

Additionally or alternatively, the above solution may be implemented using one or more application-specific integrated circuits (ASICs), field-programmable gate arrays (FPGAs), and complex programmable logic devices (CPLDs). In some other examples, the logic circuits and elements may be implemented inside a given ASIC, FPGA, or CPLD configured to control discrete MOSFETs to switch on during drive and switch off during either charging or pre-conditioning.

In some other examples, a power management integrated circuit (PMIC) may be configured to switch on and switch off low dropout regulators (LDOs) in response to detecting that one or more requirements have been met. The PMIC may be further configured to optimize power consumption of one or more switched-mode power supplies (SMPS) powering a variety of loads. The PMIC may cause the SMPS to operate in a pulse width modulation (PWM) mode in response to detecting that load is greater than a threshold and cause the SMPS to operate in a pulse frequency modulation (PFM) in response to detecting that the load is less than the threshold, thereby, increasing power consumption efficiency. The PMIC may be configured to switch off power to one or more loads in response to one of detecting that the traction battery 14 is being charged or detecting that a cabin of the vehicle 12 is being pre-conditioned.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as ASICs, FPGAs, state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An inverter for a vehicle comprising:
   a power controller and gale drive board (GDB) electrically in series, the controller including logic circuitry configured to,
   responsive to presence of an ignition signal, permit flow of low voltage power through the controller to the GDB to activate the GDB, and
   responsive to presence of a wake-up signal, but not the ignition signal, prevent flow of low voltage power through the controller to the GDB and, during the preventing, permit flow of low voltage power to energize a coil of a contactor to close the contactor.

2. The inverter of claim 1, wherein the logic circuitry includes a logic AND gate electrically in series with the GDB and configured to prevent the flow of power responsive to a confirmation that the ignition signal is not present.

3. The inverter of claim 2, wherein the logic circuitry includes a logic OR gate electrically connected between input of the controller and input of the logic AND gate, the logic OR gate being configured to permit the flow of power responsive to presence of either the ignition signal or the wake-up signal.

4. The inverter of claim 2, wherein the controller further includes a high-side switch electrically connected between output of the logic AND gate and input of the GDB, the switch being configured to: permit the flow of power to the GDB responsive to detecting that output of the logic AND gate is HIGH, and prevent the flow of power to the GDB responsive to detecting that output of the logic AND gate is LOW.

5. The inverter of claim 1, wherein the wake-up signal originates from a hybrid control unit of the controller responsive to detecting that temperature of a vehicle battery is greater than a first threshold or less than a second threshold.

6. The inverter of claim 5, Wherein the hybrid control unit is configured to, responsive to receiving the power flow, enable an electric A/C when the temperature is greater than the first threshold and enable a heater when the temperature is less than the second threshold.

7. A method comprising:
   responsive to presence of an ignition signal, by a power controller of an inverter, permitting flow of low voltage power through the controller to a gate drive board (GDB) and a resolver-to-digital converter to activate the GDB and the converter, each of the GDB and the converter being electrically in series with the controller, and
   responsive to presence of a wake-up signal, but not the ignition signal, preventing flow of low voltage power through the controller to the GDB and the converter and, during the preventing, permitting flow of low voltage power to energize a coil of a contactor to close the contactor.

8. The method of claim 7, wherein the preventing is by a logic AND gate of the controller electrically connected to input of the GDB and the converter.

9. The method of claim 8, further comprising permitting, by a logic OR gate of the controller electrically connected to input of the logic AND gate, the flow of low voltage power to the logic AND gate responsive to presence of the wake-up signal, but not the ignition signal.

10. The method of claim 8, wherein the preventing is by high-side switches electrically connected between output of the logic AND gate and respective inputs of the GDB and the converter responsive to detecting that output of the logic AND gate is LOW.

11. The method of claim 10, wherein the high-side switches include a bipolar junction transistor connected to a gate of a field-effect transistor and configured to turn on the field-effect transistor responsive to output of the logic AND gate being HIGH.

12. The method of claim 7, wherein the wake-up signal originates from a hybrid control unit of the controller responsive to detecting that temperature of a vehicle battery is greater than a first threshold or less than a second threshold.

13. The method of claim 12, further comprising, responsive to receiving the power flow, enabling, by the hybrid control unit, an electric A/C when the temperature is greater than the first threshold and enabling a heater when the temperature is less than the second threshold.

14. A system for a vehicle comprising:
   an inverter including a gate drive board (GDB) and a power controller, the controller including logic circuitry configured to,
   responsive to detecting an ignition signal, permit flow of low voltage power to the GDB to activate the GDB, and
   responsive to receiving a wake-up signal, but not the ignition signal, prevent flow of power to the GDB and permit flow of low voltage power to energize a coil of a contactor to close the contactor.

15. The system of claim 14, wherein the controller further includes a high-side switch connected between output of the logic circuitry and input of the GDB and configured to turn on to permit the flow of power responsive to output of the logic circuitry being a logical HIGH.

16. The system of claim 14, wherein the logic circuitry includes a logic AND gate configured to generate output of a logical LOW responsive to receiving the wake-up signal, but not the ignition signal.

17. The system of claim 14, further comprising a traction battery and a temperature sensor configured to measure temperature of the battery, and wherein the wake-up signal originates from a hybrid control unit of the controller responsive to detecting that the measured temperature is one of greater than a first threshold and less than a second threshold.

18. The system of claim 17, wherein the hybrid control unit is further configured to, responsive to receiving the power flow, enable an electric A/C when the measured temperature is greater than the first threshold and enable a heater when the measured temperature is less than the second threshold.

* * * * *